United States Patent
Glaze, Jr.

(10) Patent No.: US 7,546,114 B1
(45) Date of Patent: Jun. 9, 2009

(54) SECURE, LIGHT EMITTING CELL PHONE

(76) Inventor: William Glaze, Jr., 2590 Kings Hwy., Woolwich, NJ (US) 08085

( * ) Notice: Subject to any disclaimer, the term of this patent is extended or adjusted under 35 U.S.C. 154(b) by 460 days.

(21) Appl. No.: 11/337,007

(22) Filed: Jan. 23, 2006

(51) Int. Cl.
*H04M 1/66* (2006.01)
*H04M 1/02* (2006.01)
*G06T 1/00* (2006.01)
*G06K 9/00* (2006.01)
*F21L 4/00* (2006.01)

(52) U.S. Cl. .............. 455/410; 455/411; 455/575.1; 455/556.1; 340/5.82; 340/5.83; 382/115; 382/124; 362/800; 362/183

(58) Field of Classification Search ........... 455/575.1, 455/410
See application file for complete search history.

(56) References Cited

U.S. PATENT DOCUMENTS

| | | |
|---|---|---|
| 6,254,249 B1 | 7/2001 | Kim et al. |
| 6,341,871 B1 | 1/2002 | Angelopoulos |
| 6,611,697 B1 | 8/2003 | Ewing et al. |
| D492,275 S | 6/2004 | Lin et al. |
| 6,755,549 B2 | 6/2004 | Rogers et al. |
| 6,792,287 B1 * | 9/2004 | Tuomela et al. ......... 455/556.1 |
| 7,086,748 B1 * | 8/2006 | Elembaby ................ 362/88 |
| 2002/0067608 A1 | 6/2002 | Kruse et al. |
| 2005/0181745 A1 * | 8/2005 | Wood et al. ............. 455/575.1 |
| 2006/0013452 A1 * | 1/2006 | Eckert et al. ............ 382/124 |
| 2006/0189347 A1 * | 8/2006 | Bollman et al. ......... 455/556.1 |
| 2007/0086634 A1 * | 4/2007 | Setlak et al. ............ 382/128 |
| 2007/0103886 A1 * | 5/2007 | Collins ................... 362/88 |

FOREIGN PATENT DOCUMENTS

EP 969644 A1 * 1/2000
GB 2379547 A * 3/2003

OTHER PUBLICATIONS

Authors: Jain, A. K.; Ross, A. and Prabhakar, S.; Title: An Introduction to Biometric Recognition; Date: Jan. 2004; vol. 14; Issue 1; pp. 4-20.*
Authors: Meihong Li and Quishan Zhang; Title: Development of Mobile Phone Using Dual-Interface SIM and Fingerprint Recognition; Date: Apr. 3-7, 2005; pp. 956-959.*

* cited by examiner

*Primary Examiner*—Nick Corsaro
*Assistant Examiner*—Tangela T. Chambers
(74) *Attorney, Agent, or Firm*—Crossley Patent Law; Mark Ashley Crossley

(57) ABSTRACT

A secure light emitting cell phone comprising a portable parallelepiped phone with a touchpad for functional operation of the phone, a viewing screen, a speaker, a microphone, an antenna, a reflective cone within the top of the phone, an LED within the reflective cone, a transparent lens across a top of the reflective cone, a rechargeable battery powering both the phone and the LED, a button switch, alone, on a side of the phone controlling the LED, a thumb print recognition pad for authorization of phone use.

2 Claims, 1 Drawing Sheet

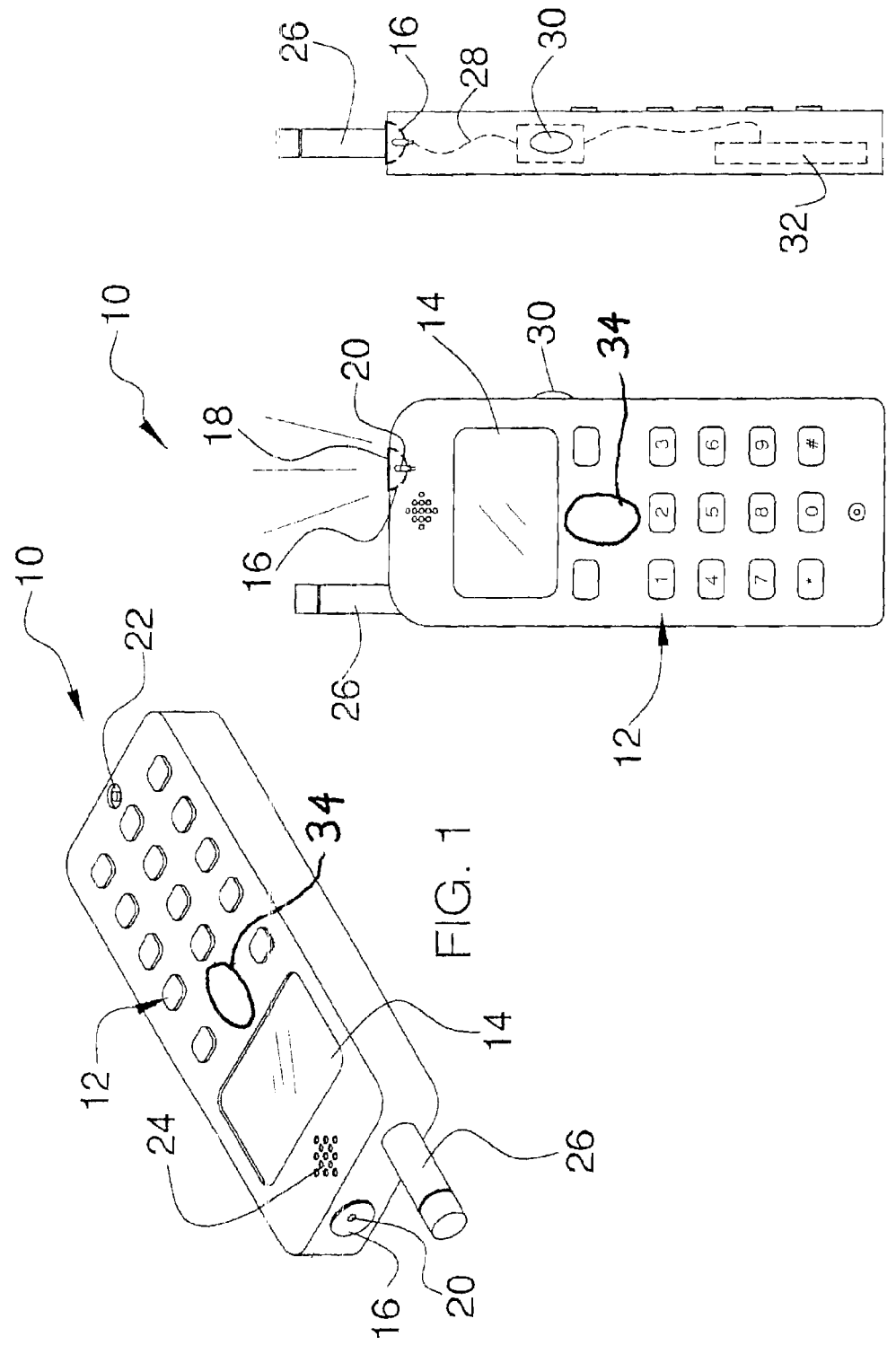

SECURE, LIGHT EMITTING CELL PHONE

BACKGROUND OF THE INVENTION

There are many reasons to need and want a light in a cell phone, examples of which include finding one's way in low light conditions, finding lost keys—concerns equal to those making small flashlights so popular over the years, even as far as adding lights to key rings. Various cell phones have offered varied forms of lighting. An added concern of cell phone users are time charges. Cell phone loss and misplacements are common, as is cell phone theft, and even brief theft for making calls. As minutes of use quickly total significant dollars, customers are continually concerned about cell phone charges. The current invention offers unique solutions to these concerns.

FIELD OF THE INVENTION

The invention relates to cell phones and more particularly to a light emitting cell phone with an LED powered by the same battery powering the cell phone functions, as well as a thumb print recognition pad for secure phone use.

SUMMARY OF THE INVENTION

The general purpose of the secure, light emitting cell phone, described subsequently in greater detail, is to provide a secure, light emitting cell phone which has many novel features that result in an improved secure, light emitting cell phone which is not anticipated, rendered obvious, suggested, or even implied by prior art, either alone or in combination thereof.

To accomplish this, the light emitting cell phone comprises a portable parallelepiped phone with a touchpad for functional operation of the phone. A typical viewing screen is within the front of the phone. The screen displays the functions of the phone, which are typical in the art. The speaker is disposed within the front of the phone, proximal to the top. A microphone is within the front of the phone. The microphone is proximal to the bottom of the phone. The antenna projects from the top of the phone. A reflective cone is within the top of the phone. Still other examples of the phone place the reflective cone within the bottom or within the side of the phone. A light emitting diode is within the center of the reflective cone. A light emitting diode is known in the art as an LED.

A transparent lens is across the top of the reflective cone. The lens shields the LED. A rechargeable battery powers both the phone and the LED. A button switch on a side of the width of the phone controls the LED. Pressing the button once lights the LED. Pressing the button again turns off the LED. Disposing the button switch for the LED alone, on one side of the cell phone offers a feature much sought after by the public, which is, control separation. A common complaint of cell phone users are multiple keys and button functions which are not only difficult to learn, but also hard to locate, and often crowded together. The small size of cell phones offers enough difficulty in tactile operation without having even more functions which can be confused. The current invention solves this issue.

Further, the invention features a thumb print recognition pad, preferably on the front of the phone, although varied examples of the invention offer varied print pad locations. With cell phone loss, theft, and unauthorized minute usage, charges accumulated are of continual concern to those responsible for payment for cell phone time. Various other methodologies have been utilized to limit cell phone usage to those authorized for use, only, however, the inconvenience of such have often proven distasteful for more than one reason. For example, it is typical of cell phones to offer keypad number/letter password entries in order to authorize use. If a user forgets their password, it is both time consuming and frustrating to re-energize the phone for resumption of use. As further example of the frustrations of such security measures, we are each of us advised in our daily computer usages to maintain dissimilar passwords for various email accounts, bank accounts, credit card accounts, just to name a few.

Using the same passwords can more easily enable identify theft, to name but one current topic of concern. Cell phones are similar in that respect, therefore, a thumb pad recognition is disposed within the invention so that a mere touch enables authorized usage, but prohibits unauthorized usage. The electronic communication of the thumb print pad communicates with the circuitry of the cell phone as does the touch pad, these functions known in the electronic arts. This is yet a further security measure when considering that we each often loan our cell phones to others around us. Instead of telling another person what a password is, the cell phone responsible party simply uses the thumb pad for cell phone energizing, then hands the phone to a permitted borrower. Thumb print recognition pads are familiar in other arts, though not yet offered in cell phones prior to the current invention.

The invention is offered in a plurality of colors and sizes. The invention combines the utility of a light which draws a minimal amount of power from the battery while providing a bright light at the same time, as well as the thumb pad recognition feature that can easily prevent very significant monetary loss.

Thus has been broadly outlined the more important features of the light emitting cell phone so that the detailed description thereof that follows may be better understood and in order that the present contribution to the art may be better appreciated.

Numerous objects, features and advantages of the light emitting cell phone will be readily apparent to those of ordinary skill in the art upon reading the following detailed description of presently preferred, but nonetheless illustrative, examples of the light emitting cell phone when taken in conjunction with the accompanying drawings. In this respect, before explaining the current examples of the light emitting cell phone in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the light emitting cell phone. It is therefore important that the claims be regarded as including such equivalent constructions insofar as they do not depart from the spirit and scope of the present invention.

Objects of the light emitting cell phone, along with various novel features that characterize the invention are particularly pointed out in the claims forming a part of this disclosure. For better understanding of the light emitting cell phone, its operating advantages and specific objects attained by its uses, refer to the accompanying drawings and description.

BRIEF DESCRIPTION OF THE DRAWINGS

FIG. 1 is a perspective view of illustrating the tactilely convenient thumb print pad recognition device.

FIG. 2 is a front elevation view, illustrating the LED button switch alone on one side of the invention's depth.

FIG. 3 is a side elevation view, the view illustrating the battery, button switch, and LED within the reflective cone.

DETAILED DESCRIPTION OF THE DRAWINGS

With reference now to the drawings, and in particular FIGS. 1 through 3 thereof, example of the light emitting cell phone employing the principles and concepts of the present invention and generally designated by the reference number 10 will be described.

The invention 10 comprises light emitting cell phone. The invention 10 comprises a portable parallelepiped phone with a touchpad 12 for functional operation of the phone. A typical viewing screen 14 is within the front of the phone. The screen 14 displays the functions of the phone, which are typical in the art. The speaker 24 is disposed within the front of the phone.

The speaker 24 is proximal to the top of the phone. A microphone 22 is within the front of the phone. The microphone 22 is proximal to the bottom of the phone. The antenna 26 projects from the top of the phone. A reflective cone 16 is within the top of the phone. This is the preferred position of the cone 16, LED 20, and lens 18, as it offers natural flashlight held use of the invention 10. Still other examples of the invention 10 place the reflective cone 16 within the bottom or within the side of the phone. A light emitting diode 20 is within the center of the reflective cone 16. A light emitting diode 20 is known in the art as an LED 20. The thumb print recognition pad 34 is disposed in the center of the phone front below the viewing screen 14. The thumb print pad 34 can be programmed within the phone 10 for use in more than one way. The thumb print recognition pad recognized an authorized user of the phone, via instructional programming provided with the invention. The phone can require thumb pad recognition prior to energizing for use. The thumb pad can be programmed to restrict out going calls, outgoing calls to long distance area or areas which charge roaming charges. Instead of a password that typically must be entered into the touch pad 12 of a cell phone, the thumb pad enables phone programming. The thumb print pad 34 can further be programmed to restrict incoming calls as desired. With just these few security measures, the invention directly addresses major concerns in cell phone use and therefore cell phone time use charges.

Referring to FIG. 2, a removable transparent lens 18 is placed across the top of the reflective cone 16. The lens 18 shields the LED 20. The LED 20 is thereby replaceable. The button switch on the side of the invention 10 controls the LED 20. There is, to many consumers, a criticality to the separately disposed button switch 30 on the side of the invention, alone. The confusion of cell phone functions, both tactile and with respect to personal memory, is a common complaint. Locating the button switch 30 as does the present invention offers a natural solution to LED 20 light function that is needed in the marketplace. The preferred central placement of the thumb pad 34 below the viewing screen 14 enables tactile energizing of the invention 10 even if the LED 20 is not used. By feeling the touch pad 12 or viewing screen 14, a user can easily locate the thumb pad for use.

Referring to FIG. 3, a rechargeable battery 32 powers both the phone functions and the LED 20. The invention 10 phone functions are typical and known in the art. A button switch 30 on a side of the width of the invention 10 controls the LED 20. Pressing the button switch 30 once lights the LED 20. Pressing the button switch 30 again turns off the LED 20. Wires 28 connect battery 32 power to the button switch 30. Wires connect the button switch 30 to the LED 20. The button switch 30 is surrounded externally by a flexible waterproof material (not shown) in order to shield the button switch 30. Locating the switch 30 on the side of the invention 10 enables easier user location of light function in even totally dark conditions. A major cell phone complaint is control confusion. Separating the switch 30, as the invention 10 does, solves that oft-noted problem.

With respect to the above description then, it is to be realized that the optimum dimensional relationships for the parts of the light emitting cell phone, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A secure light emitting cell phone comprising:
   a portable parallelepiped phone with a top, a bottom, a width, a length, and a depth;
   a touchpad for functional operation of the phone, the touchpad in the front of the phone;
   a viewing screen within the front of the phone;
   a thumb print recognition pad device disposed on the phone, the pad programmably recognizing an authorized, thumb-print identified phone operator, thereby enabling phone energization and operation;
   a speaker with the front of the phone, the speaker disposed proximally to the top of the phone;
   a microphone within the front of the phone, the microphone disposed proximal to the bottom of the phone;
   an antenna disposed within the top of the phone;
   a reflective cone within the top of the phone;
   a replaceable LED within the reflective cone;
   a removable transparent lens across a top of the reflective cone;
   powering means for the phone;
   powering means for the LED;
   a single button switch, alone, on a side of the width of the phone, the button switch controlling the powering means to the LED;
   whereby pressing the button once lights the LED, pressing the button twice turns off the LED;
   wherein the thumb print recognition pad device is located between the viewing screen and the touch pad;
   wherein the powering means for the phone and the LED is a rechargeable battery.

2. The cell phone in claim 1 wherein the button switch is externally covered by a flexible waterproof material.

* * * * *